(12) United States Patent  (10) Patent No.: US 7,733,430 B2
Huang et al.  (45) Date of Patent: Jun. 8, 2010

(54) LCD PANEL HAVING TWO PIXEL ELECTRODES, COUPLING CAPACITANCE CX, AND SATISFYING CST1/CLC1 = CST2/CLC2

(75) Inventors: Yi-Pai Huang, Hsin-Chu (TW); Te-Wei Chan, Hsin-Chu (TW); Yen-Ting Chen, Hsin-Chu (TW)

(73) Assignee: AU Optronics Corp., Hsinchu, Taiwan (CN)

( * ) Notice: Subject to any disclaimer, the term of this patent is extended or adjusted under 35 U.S.C. 154(b) by 257 days.

(21) Appl. No.: 11/783,219

(22) Filed: Apr. 6, 2007

(65) Prior Publication Data

US 2008/0030636 A1  Feb. 7, 2008

(30) Foreign Application Priority Data

Aug. 1, 2006 (TW) ............... 95128211 A

(51) Int. Cl.
G02F 1/1343 (2006.01)
(52) U.S. Cl. ............... 349/38; 349/39; 349/143; 349/144
(58) Field of Classification Search ............... 349/38, 349/39
See application file for complete search history.

(56) References Cited

U.S. PATENT DOCUMENTS

2005/0088578 A1* 4/2005 Lee et al. ............... 349/38
2006/0158576 A1* 7/2006 Kim et al. ............... 349/38
2006/0262237 A1* 11/2006 Chen et al. ............... 349/38
2007/0159587 A1* 7/2007 Kim et al. ............... 349/144
2008/0036931 A1* 2/2008 Chan et al. ............... 349/38

* cited by examiner

Primary Examiner—Andrew Schechter
Assistant Examiner—Dennis Y Kim
(74) Attorney, Agent, or Firm—Birch, Stewart, Kolasch & Birch, LLP

(57) ABSTRACT

An LCD panel includes a pixel unit having a first and a second pixel electrodes. The method includes: providing a first and a second curing voltages $V_{curing1}$, $V_{curing2}$ based on $V_1=[Cst1/(Cst1+Clc1)]\times V_{curing1}$ and $V_2=[Cst2/(Cst2+Clc2)]\times V_{curing2}$, in which, $V_1$=a voltage of the first pixel electrode and $V_2$=a voltage of the second pixel electrode, Clc1=a first liquid crystal capacitor formed by the first pixel electrode, a liquid crystal layer and a first common electrode, Cst1=a first storage capacitor formed by a first capacitor electrode, a dielectric layer and a second common electrode, Clc2=a second liquid crystal capacitor formed by the second pixel electrode, the liquid crystal layer and the first common electrode, Cst2=a second storage capacitor formed by a second capacitor electrode, the dielectric layer and a third common electrode, and applying the first and the second curing voltages simultaneously onto the second and the third common electrodes of the pixel unit to result in a ratio of the voltage of the first pixel electrode to the voltage of the second pixel electrode ranging from 0.9 to 1.1.

6 Claims, 6 Drawing Sheets

LCD PANEL HAVING TWO PIXEL ELECTRODES, COUPLING CAPACITANCE CX, AND SATISFYING CST1/CLC1 = CST2/CLC2

This nonprovisional application claims priority under 35 U.S.C. §119(a) on Patent Application No. 095128211, filed in Taiwan on Aug. 1, 2006, the entirety of which is incorporated herein by reference.

BACKGROUND OF THE INVENTION (1) Field of the Invention

The present invention relates to an LCD panel and the fabricating method thereof, and more specifically to a method for fabricating an LCD panel by means of PSA (polymer stabilized alignment) technology.

(2) Description of the Prior Art

Due to rapid development in the display technology, an LCD (liquid crystal display) device is generally preferred when compared to the conventional CRT-type display device due to its compact size and quick response time in addition to its lower power consumption and low radiation. Therefore, the LCD device is in great demand in the market and is widely used in many electronic devices, such as calculators, PDAs, notebook computers, digital cameras and mobile phones.

The LCD device manufacturers have devoted a tremendous effort in the research to improve the ability of the LCD device and lower the cost simultaneously. Therefore, the demand for the LCD device is increasing. Presently, the research is emphasized in the field how to widen the viewing angle of the LCD panel and shorten the response time for displaying the image.

In order to achieve the aforesaid objects, the LCD manufacturers have introduced a method for fabricating the LCD device utilizing the PSA (polymer stabilized alignment) technology.

The method is to form polymers within the liquid crystal layer for influencing the liquid crystal molecules in the liquid crystal layer to extend in a pretilt angle. Thus, when the voltage is applied onto the pixel electrode, an electric field is generated that forces the liquid crystal molecules in the liquid crystal layer to change their orientation from the pretilt angle to an appropriate angle, thereby shortening the response time. For better understanding of the method, a basic structure of an LCD panel is introduced below.

The LCD device generally includes a liquid crystal layer sandwiched between an upper substrate and a lower substrate. A common electrode is sandwiched between the liquid crystal layer and the upper substrate.

FIG. 1 shows a pixel structure of a conventional PSA LCD panel formed on a lower substrate, and includes a plurality of pixel units 10. Each pixel unit 10 includes a scan line 101, a data line 102, a thin film transistor 103, a storage capacitor Cst, and a pixel electrode 105. During the working operation, the scan line 101 is capable of scanning a scan signal through the transistor 103 so as to permit transmission of the voltage signal from the data line 102 to the pixel electrode 105. At the same time, since the voltage level fed through the data line 102 is still retained within the storage capacitor Cst, the pixel unit 10 can be kept under a preset gray value during the break of the data transmission.

As illustrated, the pixel electrode 105 includes a pattern having a plurality of parallel ribs extending from a center to four corners thereof (the pattern has a fish-bone configuration). Under the operation, an electric field is resulted between the pixel electrode 105 and the common electrode so as to force the liquid crystal molecules to change their orientation. The liquid crystal molecules change their orientation towards the four corners due to the configuration of the pixel electrode 105 so as to form four domains with respect to the center thereof.

In order to shorten the response time for displaying the image, after forming of the aforementioned the pixel electrode 105 in the aforesaid manner, a curing process is conducted utilizing the PSA (polymer stabilized alignment) technology so as to direct the liquid crystal molecules within the liquid crystal layer in a pretilt angle. FIG. 2 illustrates a circuit diagram of a prior art pixel unit 10 during the curing process. The circuit diagram includes the aforementioned storage capacitor Cst, and a liquid crystal capacitor Clc, wherein the liquid crystal capacitor Clc is formed by the pixel electrode 105 and a common electrode. The common electrode is kept at a predetermined voltage level during the curing process. Preferably, the common electrode is grounded (kept at the ground voltage level $V_{ground}$).

In the fabricating process of the LCD device, after adding monomers for polymer orientation into the liquid crystal layer, the curing process is performed to apply a curing voltage $V_{curing}$ onto the storage capacitor Cst such that the pixel electrode 105 may have a coupling voltage $V_{couple}$ due to the capacitor coupling, thereby turning the liquid crystal molecules to tend in a pretilt angle with the monomers tending the same direction. An ultra violet light is then applied so as to enable the monomers to combine together to form the polymers tending in the predetermined inclined angle.

When no voltage is applied onto the liquid crystal layer, the liquid crystal molecules tend in the pretilt angle under the influence of the polymers. When driven by an electric field, the liquid crystal molecules can turn swiftly from the pretilt angle into the appropriate position, thereby shortening the response time for displaying the image.

Presently, the pixel electrode 105 in the PSA LCD panel is made from ITO (indium tin oxide). Lithographic and etching processes are conducted to form the pattern with the fish-bone configuration having a plurality of parallel ribs divided in four domains, which, in turn, provides a higher contrast, a higher brightness and a shorter response time. However, it is in the trend to produce the LCD panel in a larger dimension, the aforesaid design is unable to solve the color-shift problem in changing view and to reduce the color washout phenomenon.

SUMMARY OF THE INVENTION

The object the present invention is to provide a method for fabricating an LCD panel, which is free from the color-shift problem in changing view and can reduce the color washout phenomenon. By varying a ratio of the liquid crystal capacitor and the storage capacitor in each pixel unit in a curing process, thereby to enable the pixel electrode of one pixel unit to have the same voltage level. After the curing process, the tending direction of the liquid crystal molecules in the liquid crystal layer is disposed in a more uniform manner, and no disinclination line is generated in each pixel unit. Once thus arranged, the display ability of image at the LCD panel is greatly improved.

In one aspect of the present invention, a method is provided for fabricating an LCD panel and includes the following steps. Firstly, an LCD panel is provided to include a first pixel electrode, a liquid crystal layer, a first common electrode, a first capacitor electrode, a first dielectric layer, a second common electrode, a second pixel electrode, a second capacitor electrode and a third common electrode.

The liquid crystal layer is sandwiched between the first pixel electrode and the first common electrode while the first dielectric layer is sandwiched between the first capacitor electrode and the second common electrode. The liquid crystal layer further is sandwiched between the second pixel electrode and the first common electrode. The first dielectric layer is sandwiched between the second capacitor electrode and the third common electrode.

The LCD panel further includes a plurality of pixel units. Each of the pixel units includes a first liquid crystal capacitor Clc1, a first storage capacitor Cst1, a second liquid crystal capacitor Clc2, a second storage capacitor Cst2 and a coupling capacitor Cx.

The first liquid crystal capacitor Clc1 is formed by the first pixel electrode, the liquid crystal layer and the first common electrode. The first storage capacitor Cst1 is formed by the first capacitor electrode, the first dielectric layer and the second common electrode. The first storage capacitor Cst1 is coupled to the first liquid crystal capacitor Clc1 in parallel. The second liquid crystal capacitor Clc2 is formed by the second pixel electrode, the liquid crystal layer and the first common electrode. The second storage capacitor Cst2 is formed by the second capacitor electrode, the first dielectric layer and the third common electrode. The second storage capacitor Cst2 is coupled to the second liquid crystal capacitor Clc2 in parallel. The coupling capacitor Cx is disposed between and interconnects the first and second pixel electrodes. In addition, the first and second pixel electrode are separated from each other and disconnected electrically;

According to $V_1=[Cst1/(Cst1+Clc1)] \times V_{curing1}$ and $V_2=[Cst2/(Cst2+Clc2)] \times V_{curing2}$, first and second curing voltages $V_{curing1}$, $V_{curing2}$ are provided, in which, $V_1$=voltage level of the first pixel electrode and $V_2$=voltage level of the second pixel electrode.

Afterward, the first and second curing voltages $V_{curing1}$, $V_{curing2}$ are applied simultaneously and respectively onto the second and third common electrodes so as to result in a voltage ratio of the first and second pixel electrodes ranging from 0.9 to 1.1, so as to fix the orientation of the liquid crystal molecules within the liquid crystal layer.

In a second aspect of the present invention, an LCD panel is provided and includes a plurality of pixel units. Each of the pixel units includes a first liquid crystal capacitor Clc1, a first storage capacitor Cst1, a second liquid crystal capacitor Clc2, a second storage capacitor Cst2, and a coupling capacitor Cx.

The first liquid crystal capacitor Clc1 is formed by a first pixel electrode, a liquid crystal layer and a first common electrode. The first storage capacitor Cst1 is formed by a first capacitor electrode, a first dielectric layer and a second common electrode. The first storage capacitor Cst1 is coupled to the first liquid crystal capacitor Clc1 in parallel. The second liquid crystal capacitor Clc2 is formed by a second pixel electrode, the liquid crystal layer and the first common electrode. The second storage capacitor Cst2 is formed by a second capacitor electrode, the first dielectric layer and a third common electrode, the second storage capacitor Cst2 being coupled to the second liquid crystal capacitor Clc2 in parallel. The coupling capacitor Cx is disposed between and interconnects the first and second pixel electrodes. In addition, the first and second pixel electrode are separated and disconnected electrically from each other.

The first liquid crystal capacitor Clc1, the first storage capacitor Cst1, the second liquid crystal capacitor Clc2 and the second storage capacitor Cst2 are satisfying to an equation Cst1/Clc1=Cst2/Clc2.

These and other objectives of the present invention will no doubt become obvious to those of ordinary skill in the art after reading the following detailed description of the preferred embodiment, which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1:
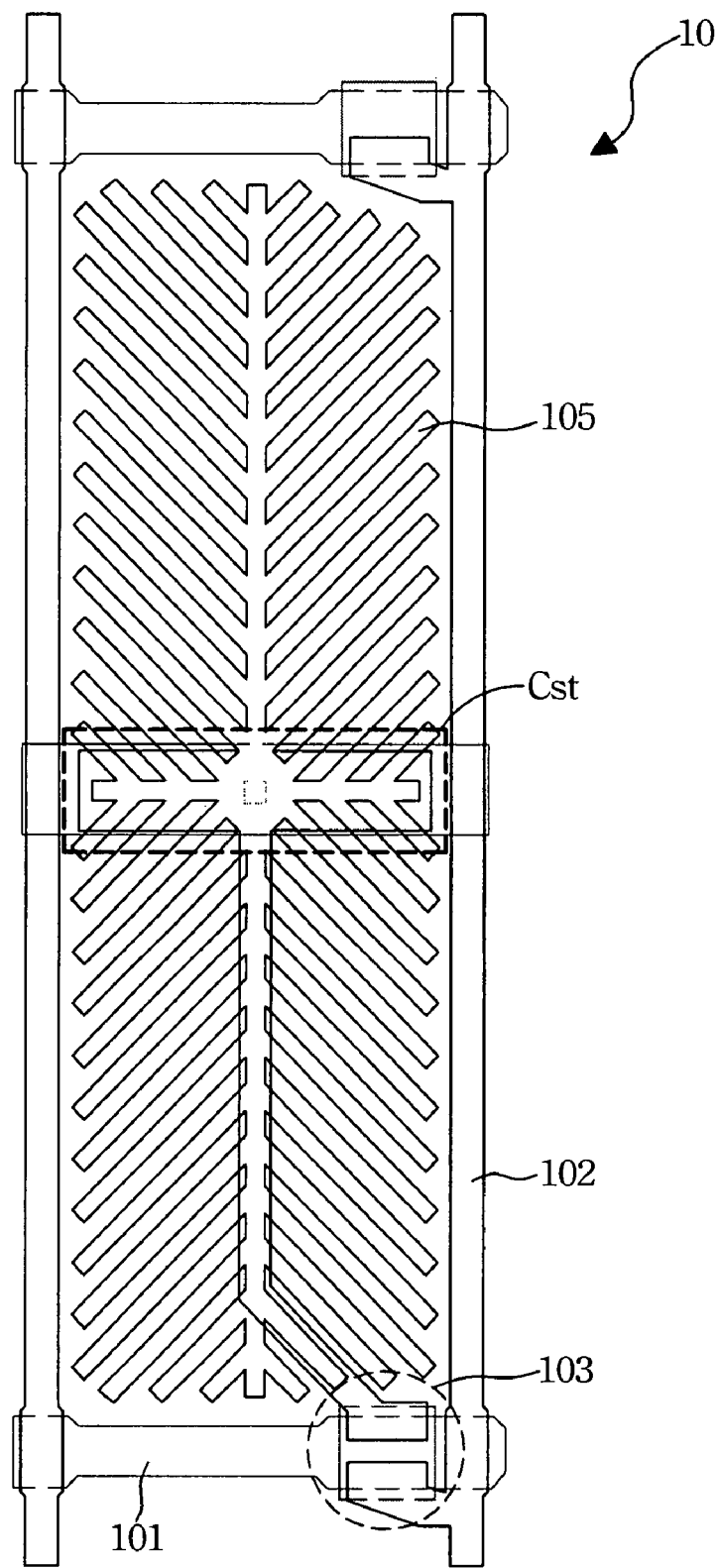
FIG. 1 is a top view of a pixel unit in a conventional PSA (polymer stabilized alignment) LCD panel.
Figure 2:
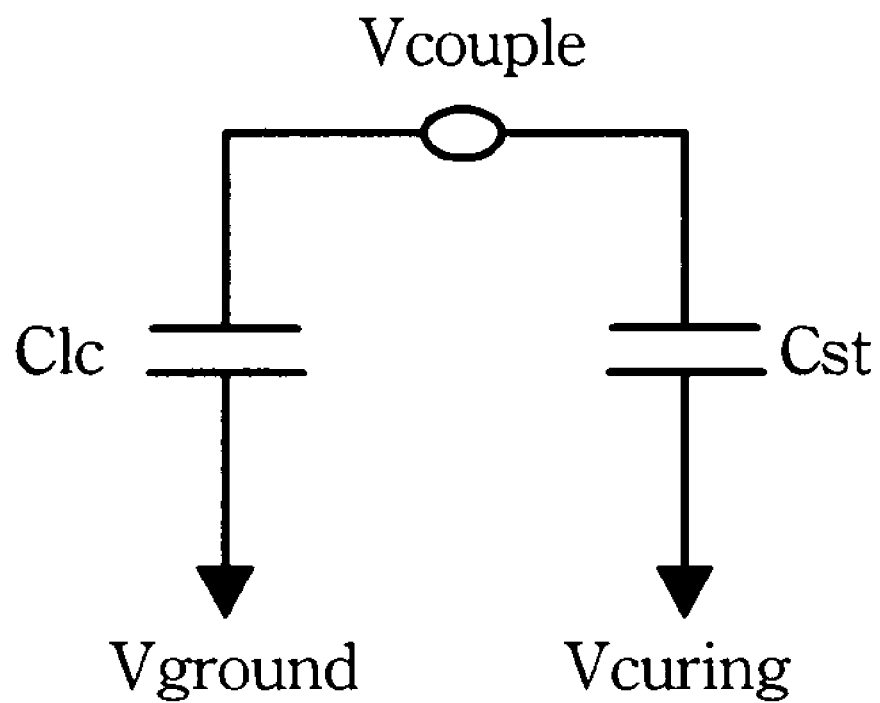
FIG. 2 illustrates a circuit diagram representing the pixel unit shown in FIG. 1 during a curing process.
Figure 3A:
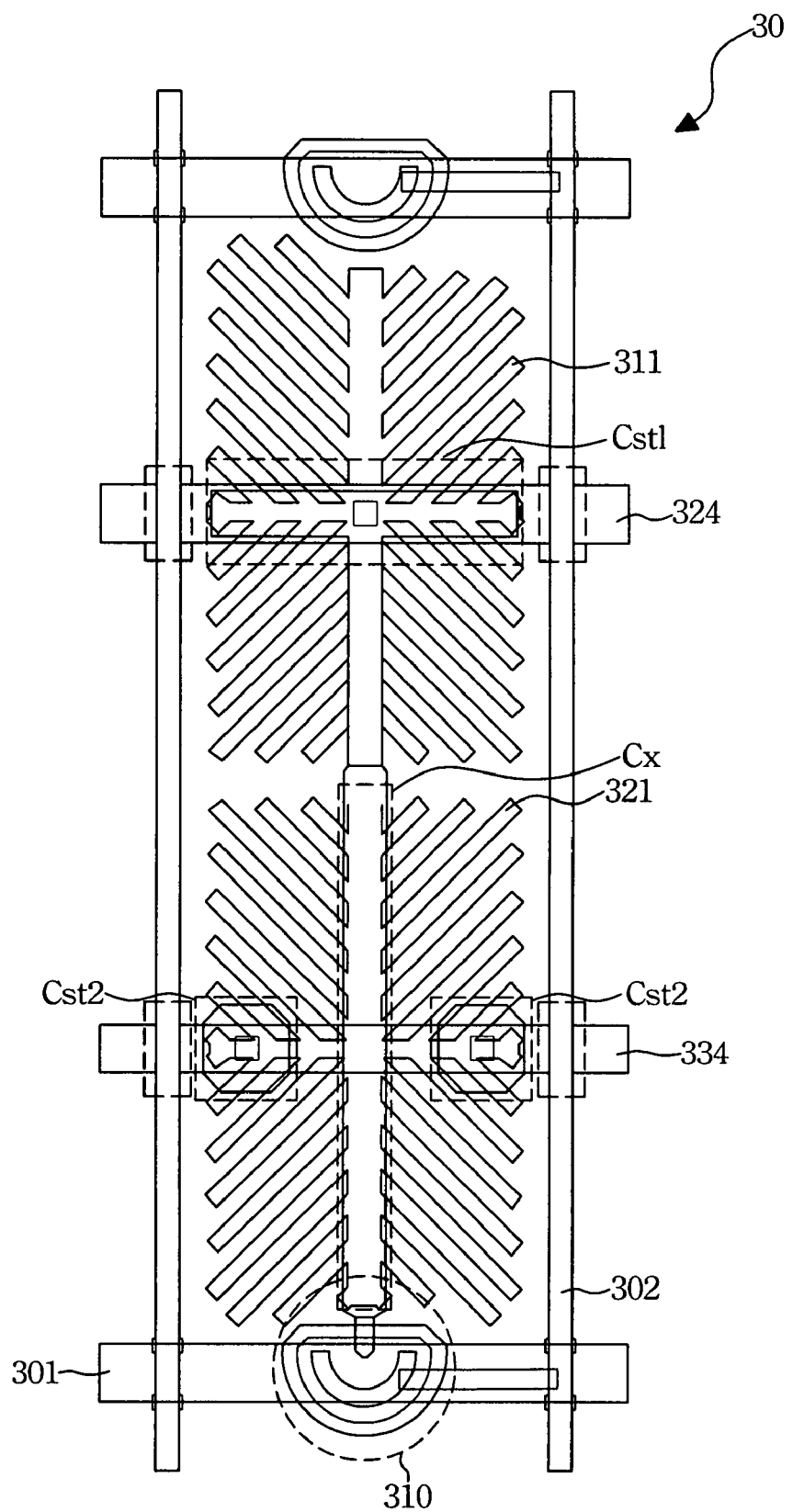
FIG. 3A is a top view of a pixel unit in a PSA (polymer stabilized alignment) LCD panel of the present invention, wherein the pattern of the pixel unit has eight domains.
Figure 4:
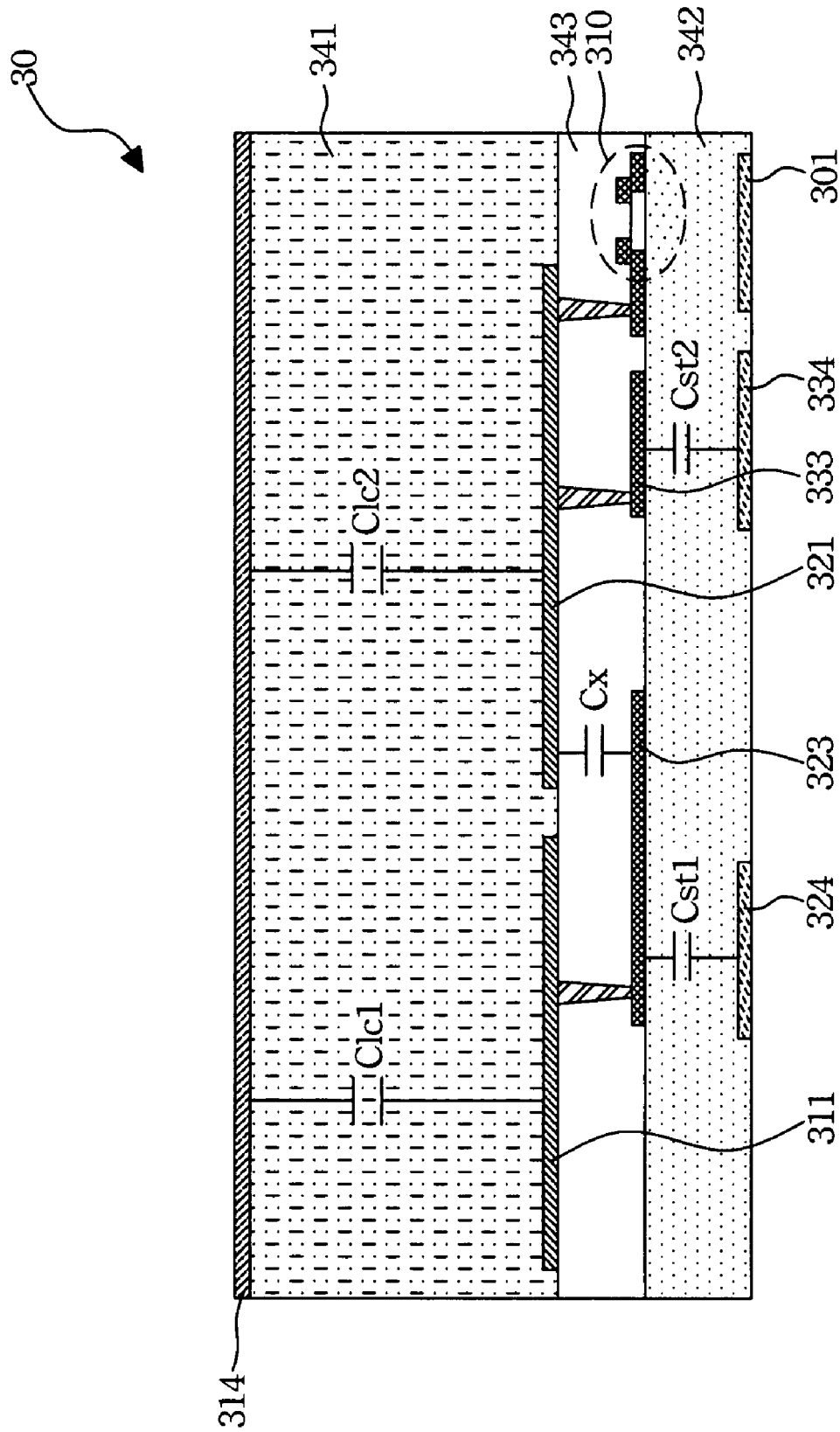
FIG. 4 is a cross-sectional view of the pixel unit shown in FIG. 3A.

An LCD panel of the present invention includes a plurality of pixel units. FIG. 3A is a top view of a pixel unit in the LCD panel of the present invention. FIG. 4 is a cross-sectional view of the pixel unit shown in FIG. 3A. As illustrated in FIG. 3A and FIG. 4, each of the pixel units 30 includes a first pixel electrode 311, a liquid crystal layer 341, a first common electrode 314, a first capacitor electrode 323, a first dielectric layer 342, a second dielectric layer 343, a second common electrode 324, a second pixel electrode 321, a second capacitor electrode 333 and a third common electrode 334.

The liquid crystal layer 341 is sandwiched between the first pixel electrode 311 and the first common electrode 314. The first dielectric layer 342 is sandwiched between the first capacitor electrode 323 and the second common electrode 324. The second dielectric layer 343 is sandwiched between the first pixel electrode 311 and the first capacitor electrode 323. The liquid crystal layer 341 is further sandwiched between the second pixel electrode 321 and the first common electrode 314. The first dielectric layer 342 is further sandwiched between the second capacitor electrode 333 and the third common electrode 334. The second dielectric layer 343 is further sandwiched between the second pixel electrode 321 and the second capacitor electrode 333.

In addition, the first and second pixel electrodes 311, 321 are separated from each other. In other words, the first and second pixel electrode 311, 321 are disposed to be spaced apart from each other.

Figure 5:
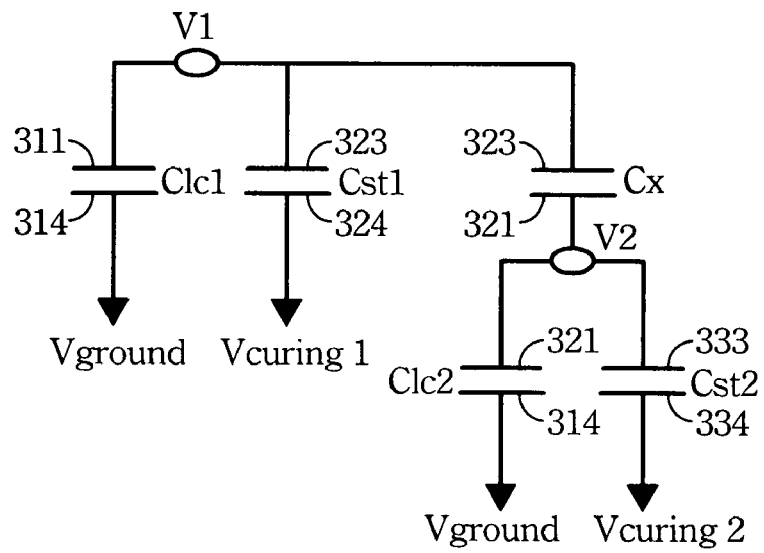
FIG. 5 illustrates a circuit diagram representing the pixel unit shown in FIG. 3A during a curing process.

Referring to FIG. 5, due to the abovementioned arrangement, each of the pixel units 30 includes a first liquid crystal capacitor Clc1, a first storage capacitor Cst1, a second liquid crystal capacitor Clc2, a second storage capacitor Cst2 and a coupling capacitor Cx.

The first liquid crystal capacitor Clc1 is formed by the first pixel electrode 311, the liquid crystal layer 341 and the first common electrode 314. In other words, the first pixel electrode 311, the liquid crystal layer 341 and the first common electrode 314 cooperatively form the first liquid crystal capacitor Clc1. The first storage capacitor Cst1 is formed by the first capacitor electrode 323, the first dielectric layer 342 and the second common electrode 324. In other words, the first capacitor electrode 323, the first dielectric layer 342 and the second common electrode 324 cooperatively form the first storage capacitor Cst1. The first storage capacitor Cst1 is further coupled to the first liquid crystal capacitor Clc1 in parallel.

The second liquid crystal capacitor Clc2 is formed by the second pixel electrode 321, the liquid crystal layer 341 and the first common electrode 314. In other words, the second pixel electrode 321, the liquid crystal layer 341 and the first common electrode 314 cooperatively form the second liquid crystal capacitor Clc2. The second storage capacitor Cst2 is formed by the second capacitor electrode 333, the first dielectric layer 342 and the third common electrode 334. In other words, the second capacitor electrode 333, the first dielectric layer 342 and the third common electrode 334 cooperatively form the second storage capacitor Cst2. The second storage capacitor Cst2 is further coupled to the second liquid crystal capacitor Clc2 in parallel. The coupling capacitor Cx, between the first pixel electrode 311 and the second pixel electrode 321, is formed by the second pixel electrode 321, the second dielectric layer 343 and the first liquid crystal electrode 323.

Figure 3B:
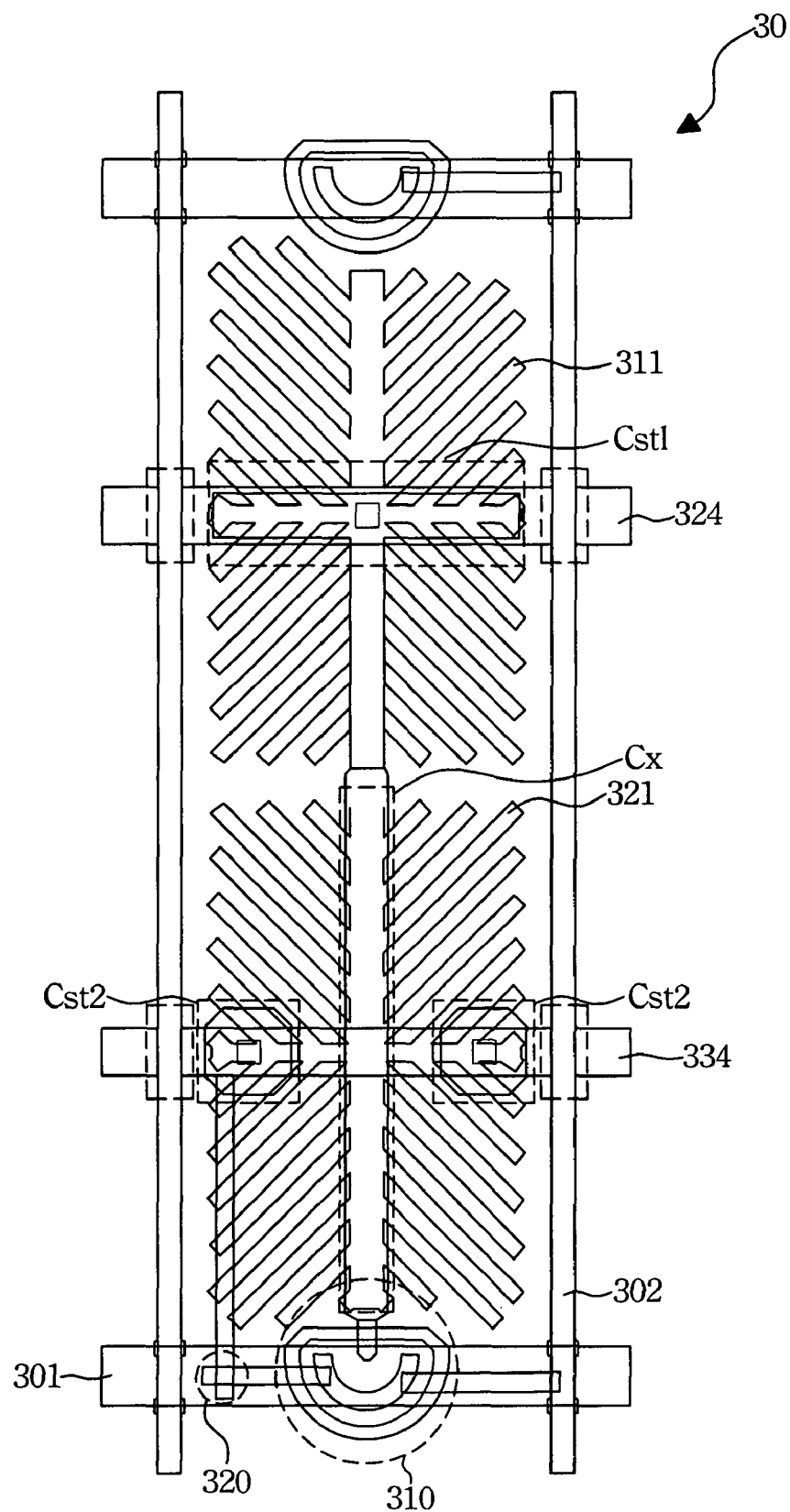
FIG. 3B is a top view of a modified pixel unit in a PSA (polymer stabilized alignment) LCD panel of the present invention.

As illustrated in FIG. 3A, the pixel unit 30 further includes a scan line 301, a data line 302, and a first thin film transistor (TFT) 310. During the operation, the scan line 301 is used for transmitting a scan signal while the data line 302 is used for transmitting a voltage signal. The first thin film transistor 310 is applied to switch on in response to the scan signal in order to permit transmission of the voltage signal to the first pixel electrode 311, wherein, the first pixel electrode 311 is electrically connected to the first transistor 310. As illustrated in FIG. 3B, the pixel unit 30 may further include a second transistor 320. A transistor with a lower charging ability than the first transistor 310 can be selected for serving the second transistor 320. The second transistor 320 has a gate coupled to the scan line 301 and source/drain terminals coupled respectively to the data line 302 and the second pixel electrode 321. The second transistor 320 is adapted to be switched on in response to the scan signal to establish a communication between the data line 302 and the second pixel electrode 321 so as to enable the second transistor 320 to discharge the accumulated charge from the second pixel electrode 321 via the scan line 301. Thus, no image sticking phenomenon may occur.

A method is provided according to the present invention for fabricating an LCD panel utilizing the PSA technology and the curing process so as to cure the orientation of the liquid crystal molecules within the liquid crystal layer. According to the method, an LCD panel is provided having the abovementioned elements and a plurality of the pixel units 30.

FIG. 5 illustrates a circuit diagram representing the pixel unit shown in FIG. 3A during a curing process. From the circuit diagram, two equations can be obtained $V_1 = [Cst1/(Cst1+Clc1)] \times V_{curing1}$; and $V_2 = [Cst2/(Cst2+Clc2)] \times V_{curing2}$, in which, $V_1$=voltage level of the first pixel electrode 311 and $V_2$=voltage level of the second pixel electrode 321.

Afterwards, according to $V_1 = [Cst1/(Cst1+Clc1)] \times V_{curing1}$ and $V_2 = [Cst2/(Cst2+Clc2)] \times V_{curing2}$, first and second curing voltages $V_{curing1}$, $V_{curing2}$ are applied simultaneously and respectively onto the second and third common electrodes 324, 334 so as to result in a voltage ratio of the first and second pixel electrodes 311, 321 ranging from 0.9 to 1.1. Preferably, the first and second pixel electrodes 311, 321 may have the same voltage level (V1=V2) to fix the orientation of the liquid crystal molecules and obtain the more uniform distribution of the liquid crystal molecules along the pretilt angle.

Prior to conducting the curing process, the voltage level for applying onto the first common electrode 314 must be defined in addition to the voltage levels of the first and second curing voltages $V_{curing1}$, $V_{curing2}$. In general, the voltage level of the first common electrode 314 is grounded ($V_{ground}$).

In a first embodiment, when a capacitance ratio the first storage capacitor Cst1 and the first liquid crystal capacitor Clc1 is not equal to that of the second storage capacitor Cst2 and the second liquid crystal capacitor Clc2, the fabricating method further includes the following steps.

Firstly, according to $V_1 = [Cst1/(Cst1+Clc1)] \times V_{curing1}$, the first curing voltage $V_{curing1}$, to let the voltage level V1 of the first pixel electrode 311 be equal to that of the coupling capacitor Cx, is determined. The first curing voltage $V_{curing1}$ is applied onto the second common electrode 324.

According to $V2 = [Cst2/(Cst2+Clc2)] \times V_{curing2}$, the second curing voltage $V_{curing2}$, to let the voltage level V2 of the second pixel unit 321 be equal to that of the coupling capacitor Cx, is generated. The second curing voltage $V_{curing2}$ is applied onto the third common electrode 334.

In other words, during the curing process for tilting the liquid crystal molecules in the liquid crystal layer in the pretilt angle and based on the aforesaid equations, the voltage levels of the first and second curing voltage $V_{curing1}$, $V_{curing2}$ are determined and then applied respectively on the second and third common electrodes 324, 334, which enable a ratio between the voltage V1 of the first pixel electrode 311 and the voltage V2 of the second pixel electrode 321 ranging 0.9 to 1.1. In a preferred embodiment, the voltages V1 and V2 are controlled to be equal to the coupling voltage V of the coupling capacitor Cx, namely V1=V2=V.

In one embodiment, assuming that Cst1=0.1312 pF, Cst2=0.087 pF and Clc1=Clc2=0.0396 pF. When the first curing voltage $V_{curing1}$=60V, the second curing voltage $V_{curing2}$=44.5V, the voltage level V1, V2 of each of the first and second pixel electrodes 311, 321 both are 14V. On other words, application of two different curing voltages can cause the first and second pixel electrodes to have the substantially same voltage so as to avoid the non-uniform arrangement of the liquid crystal molecules in the liquid crystal layer.

Therefore, when a ratio between the first storage capacitor Cst1 and the first liquid crystal capacitor Clc1 is not equal to that between the second storage capacitor Cst2 and the second liquid crystal capacitor Clc2, the first and second curing voltages $V_{curing1}$, $V_{curing2}$ with different levels can be applied respectively on the second and third common electrodes 324, 334 so as to enable the first and second pixel electrodes 311, 321 to have the voltage ratio ranging 0.9 to 1.1. Preferably, the voltage V1 of the first pixel electrode 311 and the voltage V2 of the second pixel electrode 321 are controlled to be equal.

The advantage of aforementioned method is that the curing voltage can be adjusted according to the varying ratio of capacitance. However, during the fabrication of the LCD panel, since two different voltage levels are required to be controlled, the method is relatively complicated.

In a second embodiment, in order to achieve the object of applying the single curing voltage ($V_{curing1}$=$V_{curing2}$) so as to enable the first and second pixel electrodes to have the same voltage level (V1=V2), the ratio of the first liquid crystal capacitor Clc1, the first storage capacitor Cst1, the second liquid crystal capacitor Clc2 and the second storage capacitor Cst2 should be adjusted.

From the aforementioned equation, it can be assumed that when the voltage levels of the first and second pixel electrodes are equal, namely V1=V2, and the voltage levels of the first and second curing voltages are equal, namely $V_{curing1}=V_{curing2}$, the ratio between the first storage capacitor Cst1 and the first liquid crystal capacitor Clc1 is equal to that between the second storage capacitor Cst2 and the second liquid crystal capacitor Clc2, i.e. Cst1/Clc1=Cst2/Clc2.

In other words, when the ratio between the first storage capacitor Cst1 and the first liquid crystal capacitor Clc1 is equal to that between the second storage capacitor Cst2 and the second liquid crystal capacitor Clc2, only a single curing voltage level is required to be applied on the second and the third common electrodes 324,334 (i.e. the first curing voltage=the second curing voltage). The first and second pixel electrodes 311, 321 have the same voltage level (V1=V2).

Therefore, during the fabrication of the LCD panel, the ratio between the first storage capacitor Cst1 and the first liquid crystal capacitor Clc1 must equal to the ratio between the second storage capacitor Cst2 and the second liquid crystal capacitor Clc2. In order to achieve this effect, the following steps are carried out.

By varying the dimension of the first and second capacitor electrodes 323, 333 so as to result in variation in the surface areas of the first and second capacitor electrodes 323, 333.

By varying the dimension of the first and second pixel electrodes 311, 321 so as to result in variation in the surface areas of the first and second pixel electrodes 311, 321. In addition, by varying the dimension of the second and third common electrodes 324, 334 so as to result in variation in the surface areas of the second and third common electrodes 324, 334.

Adjustment in the surface areas of the aforesaid electrodes enables the first storage capacitor Cst1 and the first liquid crystal capacitor Clc1 to have the ratio the same as that of the second storage capacitor Cst2 and the first liquid crystal capacitor Clc2. Under this condition, the first and second curing voltage $V_{couring1}$, $V_{couring2}$ with the single voltage level can be applied onto the second and third common electrodes 324, 334 so as to enable the ratio between the first and second pixel electrodes 311, 321 ranging from 0.9 to 1.1. Preferably, the voltage level V1 of the first pixel electrode 311 is equal to the voltage level V2 of the second pixel electrode 321.

As mentioned in the aforementioned paragraphs, the pixel unit of LCD panel of the present invention has the first and second pixel electrodes 311, 321 separated from each other. Referring to FIG. 3A, the first pixel electrode 311 has a pattern scattered from a center in such a manner to form four domains. Each of the four domains of the first pixel electrode 311 includes a plurality of parallel ribs extending in the same direction.

The second pixel electrode 321 has a pattern scattered from a center in such a manner to form four domains. Each of the four domains of the first pixel electrode 321 includes a plurality of parallel ribs extending in the same direction.

Preferably, each of the parallel ribs of a respective one of the four domains defines an angle with respect to a line passing through the center ranging 40-50 degrees, 130-140 degrees, 220-230 degrees and 310-320 degrees. Therefore, the pattern of each of the first and second pixel electrodes 311, 321 in the pixel unit 30 has a fish-bone configuration.

Figure 6:
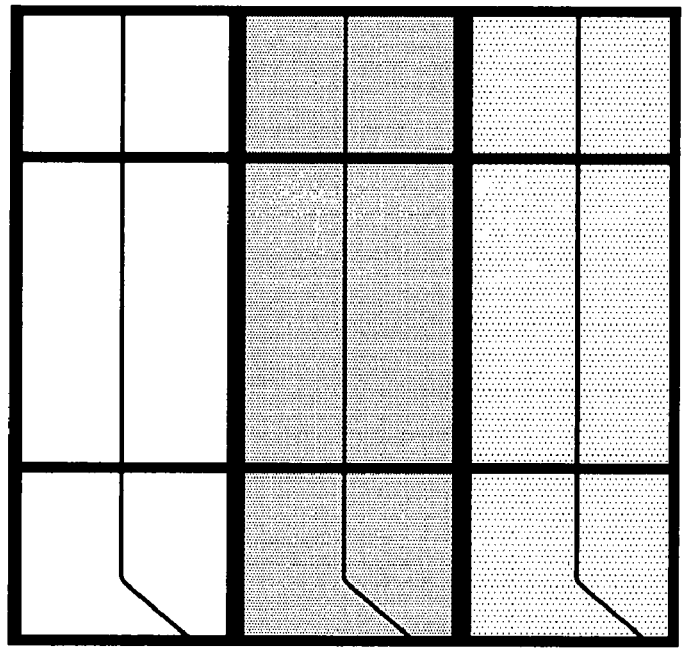
FIG. 6 illustrates an image of the pixel unit shown in FIG. 3A.

FIG. 6 illustrates an image of the pixel unit of the LCD panel of the present invention. The voltage ratio (V1/V2) of the first and second pixel electrodes 311, 321 can be arranged between 0.9 to 1.1, whether the first or second embodiment is utilized in the fabricating method of the present invention and arranging the voltage level of the first and second electrodes 311, 321 to have the same magnitude. Thus, after the curing process, since no disinclination line is generated among the liquid crystal molecules, the tending direction of the liquid crystal molecules in the liquid crystal layer is disposed in a more uniform manner and the display ability of image at the LCD panel is greatly improved.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An LCD panel comprising:
a first pixel electrode, a liquid crystal layer, a first common electrode, a first capacitor electrode, a first dielectric layer, a second common electrode, a second pixel electrode, a second capacitor electrode and a third common electrode, wherein:
the first pixel electrode, the liquid crystal layer and the first common electrode form a first liquid crystal capacitor;
the first capacitor electrode, the first dielectric layer and the second common electrode form a first storage capacitor Cst1 coupled to the first liquid crystal capacitor Clc1 in parallel;
the second pixel electrode, the liquid crystal layer and the first common electrode form a second liquid crystal capacitor Clc2, and the first and second pixel electrodes being separated from each other;
the second capacitor electrode, the first dielectric layer and the third common electrode form a second storage capacitor Cst2 coupled to the second liquid crystal capacitor Clc2 in parallel, wherein the second common electrode and the third common electrode are separated from each other;
a coupling capacitor Cx formed by the first capacitor electrode and the second pixel electrode; and
the first liquid crystal capacitor Clc1, the first storage capacitor Cst1, the second liquid crystal capacitor Clc2 and the second storage capacitor Cst2 are satisfying to an equation Cst1/Clc1=Cst2/Clc2.

2. The LCD panel according to claim 1, wherein the first and second capacitor electrodes have surface areas different from each other.

3. The LCD panel according to claim 1, wherein the second and third common electrodes have surface areas different from each other.

4. The LCD panel according to claim 1, wherein the first and second pixel electrodes have surface areas different from each other.

5. The LCD panel according to claim 1, wherein the first pixel electrode has a pattern scattered from a center in such a manner to form four domains, each of the four domains of the first pixel electrode including a plurality of parallel ribs extending in a predetermined inclined direction.

6. The LCD panel according to claim 1, wherein the second pixel electrode has a pattern scattered from a center in such a manner to form four domains, each of the four domains of the second pixel electrode including a plurality of parallel ribs extending in a predetermined inclined direction.

* * * * *

UNITED STATES PATENT AND TRADEMARK OFFICE
CERTIFICATE OF CORRECTION

| | | |
|---|---|---|
| PATENT NO. | : 7,733,430 B2 | Page 1 of 1 |
| APPLICATION NO. | : 11/783219 | |
| DATED | : June 8, 2010 | |
| INVENTOR(S) | : Yi-Pai Huang et al. | |

It is certified that error appears in the above-identified patent and that said Letters Patent is hereby corrected as shown below:

ON THE TITLE PAGE:

Change item (73), Assignee, to read as follows:

-- (73)   Assignee: AU Optronics Corp., Hsinchu (TW) --.

Signed and Sealed this

Fifteenth Day of February, 2011

David J. Kappos
*Director of the United States Patent and Trademark Office*